United States Patent [19]

Fergeson et al.

[11] Patent Number: 4,805,170
[45] Date of Patent: Feb. 14, 1989

[54] DATA COMMUNICATION NETWORK

[75] Inventors: Allen D. Fergeson, Johnstown; Anwar Khurshid, Reynoldsburg; David M. Rouse, Columbus, all of Ohio

[73] Assignee: American Telephone and Telegraph Company, AT&T Bell Laboratories, Murray Hill, N.J.

[21] Appl. No.: 43,771

[22] Filed: Apr. 29, 1987

[51] Int. Cl.$^4$ .............................. H04J 3/16; H04J 3/17
[52] U.S. Cl. .................................... 370/89; 340/825.5
[58] Field of Search ............................. 370/89, 90, 94; 340/825.5, 825.51, 825.05

[56] References Cited

U.S. PATENT DOCUMENTS

| | | | |
|---|---|---|---|
| Re. 31,852 | 3/1985 | Soderblom | 370/90 |
| 3,752,932 | 8/1973 | Frisone | 370/90 |
| 4,517,644 | 5/1985 | Hamada et al. | 340/825.05 |
| 4,554,659 | 11/1985 | Blood et al. | 370/88 |
| 4,566,097 | 1/1986 | Bederman | 370/89 |
| 4,566,098 | 1/1986 | Gammage et al. | 370/89 |
| 4,583,217 | 4/1986 | Kittel | 370/89 |
| 4,616,359 | 10/1986 | Fontenot | 370/60 |

Primary Examiner—Robert L. Griffin
Assistant Examiner—Min Jung
Attorney, Agent, or Firm—Dwight A. Marshall

[57] ABSTRACT

A network for data transmission between nodes interconnected by transmission paths on which a predefined data signal is continuously transmitted to sequentially reach each node. Data traffic is controlled by apparatus responsive to receiving the predefined data signal a predetermined number of times and generating node signals each varying in time in accordance with data traffic on the network to control node access thereto. Multiple nodes are enabled to mutually write data onto the network proportional to the communication network data traffic independent of the network location of the predefined data signal.

22 Claims, 2 Drawing Sheets

4,805,170

DATA COMMUNICATION NETWORK

TECHNICAL FIELD

The invention relates to communication networks.

BACKGROUND OF THE INVENTION

Data systems use communication networks to exchange data. Typically, a communication network, hereinafter called network, has transmission paths interconnecting nodes each coupled to the data systems with each node arranged to write data generated by a data system onto the network and to read data addressed to a data system off the network. Some networks are arranged such that one node may continuously write data onto the network thereby preventing other nodes from gaining access to the network. Other networks use token data that is continuously transmitted on the transmission paths to sequentially arrive at each node. The token data arrival enables a node having write data to write the write data onto the network. A problem arises in that the data traffic handling capacity of such networks are limited in that nodes are prevented from writing data onto the network until the one node ceases to write data onto the network or until each node receives the token data.

SUMMARY OF THE INVENTION

The foregoing problem is solved and communication networks are substantially enhanced by nodes having apparatus responsive to receiving a predefined data signal continuously transmitted on the network and counting the predefined data signal a predetermined number of times to control node access to the network such that multiple nodes may mutually write data onto the network proportional to the network data traffic independent of the network location of the predefined data signal.

The illustrative communication network has nodes interconnected by transmission paths on which a predefined data signal is continuously transmitted to sequentially reach each node. The network structure and method of operation detects the receipt of the predefined data signal at each node and counts the number of times that the predefined data signal is detected by the node. Node signal generating apparatus generates signals in response to the nodes having counted a predetermined number of the detected predefined data signals and selectively controls the nodes so that multiple nodes may mutually write data onto the network in proportion to the network data traffic and independent of the network location of the predefined data signal.

DETAILED DESCRIPTION

Figure 1:
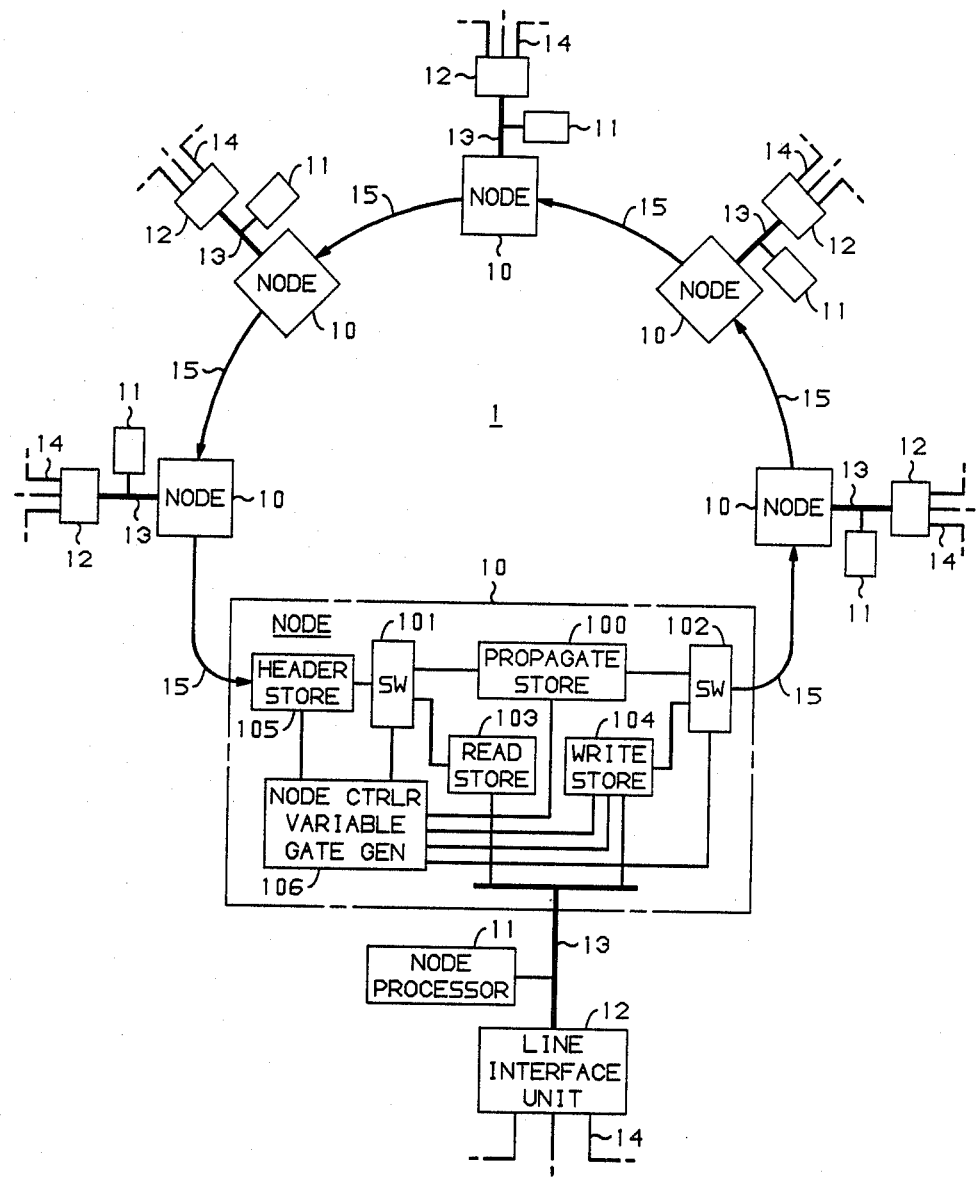
FIG. 1 is a block diagram of a network embodying the principles of the invention.

Network 1 of FIG. 1 has transmission paths 15 interconnecting nodes 10 each connected by a bus 13 to a node processor 11 and a line interface unit 12. Data incoming to node 10 on data link 14 is entered by line interface unit 12 onto bus 13 and processed by node processor 11 into write data which is stored in write store 104. Subsequently, write store 104 writes the stored write data, via switch 102, onto a transmission path 15 outgoing from node 10. Data written onto network 1 is transmitted on transmission paths 15 from node to node.

Figure 2:
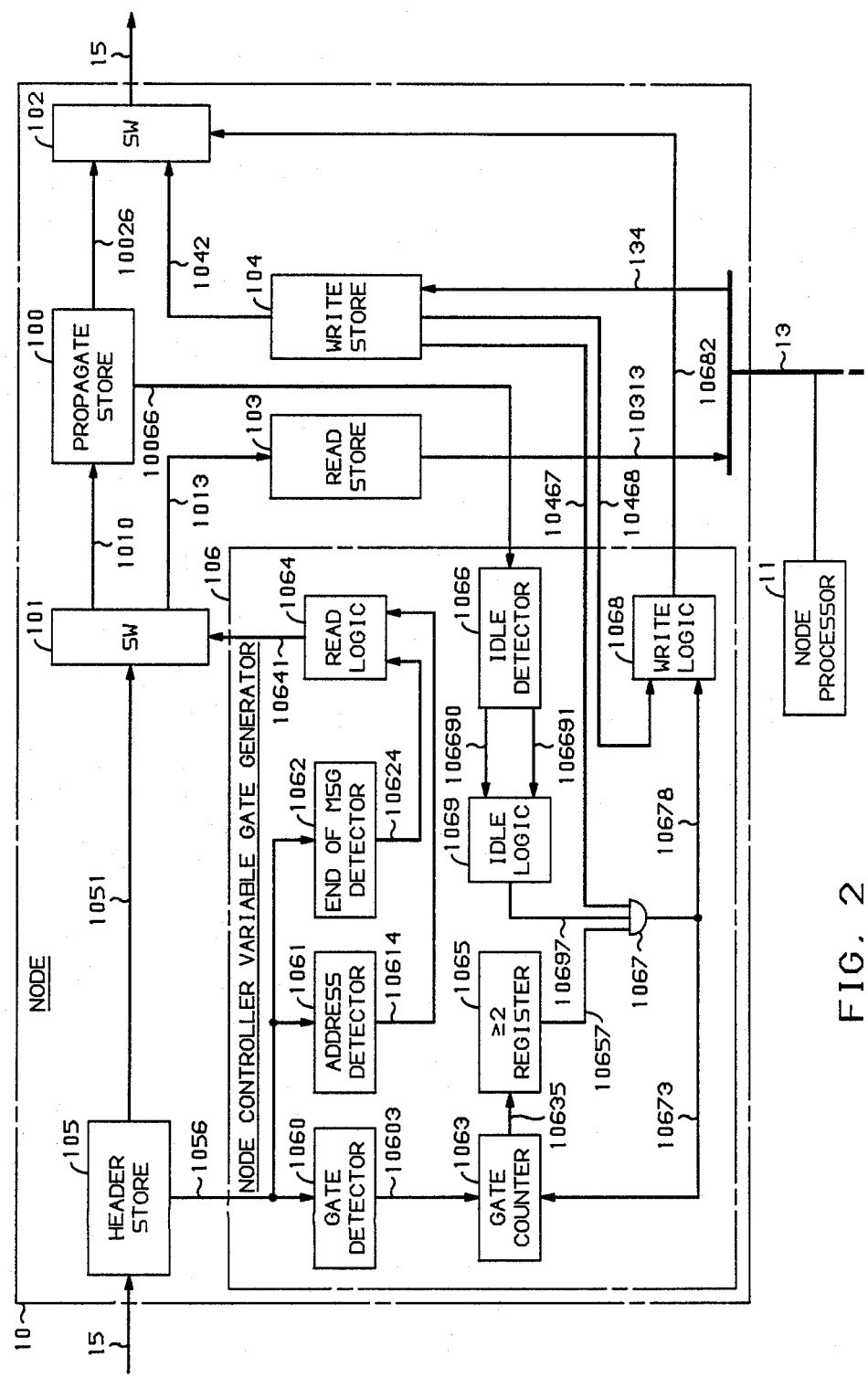
FIG. 2 illustrates the functional apparatus relationship of a network node of the network set forth in FIG. 1.

Data received by a node 10 on incoming transmission path 15 is stored in header store 105. If intended for another node 10, the received data is stored, via switch 101, in propagate store 100 and subsequently transmitted, via switch 102, on a transmission path 15 outgoing from node 10. When a header portion of the received data stored in header store 105 identifies a node 10 as the destination, address detector 1061 of node controller variable gate generator 106, FIG. 2, enables logic circuit 1064 to set switch 101 to read the received data into read store 103. End of message detector 1062 resets read logic 1064 to enable switch 101, via lead 10641, to connect header store 105 through transmission path 1051 with propagate store 100 which in turn is coupled with outgoing transmission path 15 through transmission path 10026 and switch 102. Read data is read from read store 103, onto bus 13 into node processor 11, FIG. 1, and transmitted via line interface unit 12 onto a data link 14.

Each node 10 can write data stored in write store 104 onto network 1 concurrently with other nodes 10 which are also writing data onto network 1. In order to insure that each node 10 has access to network 1, a predefined data signal is continuously transmitted on transmission paths 15 to sequentially reach each node 10. The predefined data signal incoming to a node 10 is temporarily stored in header store 105. Gate detector 1060, FIG. 2, detects the presence of the predefined data signal stored in header store 105 and advances gate counter 1063 one count. If gate counter 1063 has counted a total count less than or equal to a predetermined number, for example two, register 1065 remains in an inoperative state thereby inhibiting operation of AND gate 1067. With AND gate 1067 inhibited, write logic 1068 remains in a reset state thereby enabling switch 102 to continue connecting propagate store 100, via transmission path 10026, with outgoing transmission path 15. The predefined data signal is subsequently transmitted from header store 105, via transmission paths 1051, 1010, 10026; switches 101, 102; and propagate store 100, onto outgoing transmission path 15. Node 10 may have write data recorded in write store 104 at this time, however node 10 is delayed in writing the write data onto network 1 until node controller variable gate generator 106 has counted the predetermined number of the detected predefined data signals.

The predefined data signal continues to be transmitted on transmission paths 15 between nodes 10. The time that it takes the predefined data signal to return to a node 10 depends upon the amount of data traffic being handled by network 1. If there is a small amount of data traffic, the predefined data signal will return to a node 10 in a short period of time. When there is a large amount of data traffic, the time period increases as to when the predefined data signal returns to a node 10.

Upon return, gate detector 1060 again detects the presence of the predefined data signal in header store 105 and advances gate counter 1063. When register 1065 detects the predetermined number of times that node 10 has detected the predefined data signal, register 1065 enables an input of AND gate 1067 via lead 10657. If node 10 has not received any write data over buses 13 and 134, write store 104 is empty thereby inhibiting operation of AND gate 1067 via lead 10467. The predefined data signal is thereby transmitted via transmission paths 1051, 1010, 10026; switches 101, 102; and propagate store 100 from node 10 on out-going transmission path 15.

When propagate store 100 is transmitting node received data on transmission path 10026, idle detector 1066 resets idle logic 1069 to record an active state thereby inhibiting an input of AND gate 1067 via lead 10697. After transmission of received data on transmission path 10026, idle detector 1066 sets idle logic 1069 to record an idle state enabling an input of AND gate 1067.

Write store 104, when empty of write data, maintains a signal on lead 10467 to inhibit operation of AND gate 1067. Thus, data received at node 10 on incoming transmission path 15 is transmitted from node 10 on outgoing transmission path 15 in that switch 102 is enabled by write logic 1068 to connect propagate store 100 through transmission path 10026 with outgoing transmission path 15. Upon receipt of write data, write store 104 enables an input of AND gate 1067 via lead 10467 to indicate that node 10 has stored write data to be written onto network 1.

AND gate 1067 responds to the idle state recorded by idle logic 1069 and to an indication on lead 10467 that write store 104 has received write data by generating a signal setting write logic 1068 to enable switch 102 to disconnect outgoing transmission path 15 from propagate store 100 and connect it to write store 104 via transmission path 1042 when register 1065 has recorded the predetermined number of times that the predefined data signal has been detected by node 10. In addition, the AND gate 1067 generated signal enables lead 10673 to initialize gate counter 1063 to return to the initial count of zero.

Node 10 then proceeds to write the stored write data from write store 104 onto network 1 over transmission path 1042 through switch 102 onto outgoing transmission path 15. Upon detecting the end of the write data, write store 104 enables lead 10468 to reset write logic 1068 to enable switch 102 to disconnect write store 104 from outgoing transmission path 15 which is then reconnected to propagate store 100. Node 10 temporarily stores data received on incoming transmission path 15 in propagate store 100 as write data is being written from write store 104 onto outgoing transmission path 15. When switch 102 reconnects propagate store 100 with outgoing transmission path 15, propagate store 100 transmits the stored received data onto outgoing transmission path 15.

Node controller variable gate generator 106 enables multiple nodes 10 to access and mutually write data onto network 10 proportional to the network data traffic. The method comprises detecting a predefined data signal that is continuously transmitted on the network to sequentially reach each node 10 and counting the number of the times the predefined data signal is detected by a node 10. The method further generates gate signals at nodes 10 in response to having counted a predetermined number of the detected predefined data signals to control nodes 10 such that multiple nodes 10 may access and mutually write data onto network 1 independent of the network location of the predefined data signal.

Data traffic on network 1 determines the amount of time it takes the predefined data signal to reach each node 10. When data traffic is heavy, it takes a longer period of time for the predefined data signal to reach each node 10 and less time when data traffic is light. Node controller variable gate generator 106 responds to a predetermined number of detected predefined data signals by generating gate signals on lead 10657 that vary in time in accordance with the amount of data traffic on network 1. The generated signals control node 10 access to network 1 and since each node 10 is provided with node controller variable gate generator 106, then multiple ones of nodes 10 may mutually write data onto network 1 proportional to the network data traffic independent of the network location of the predefined data signal.

What is claimed is:

1. In a network having nodes interconnected by transmission paths on which a predefined data signal is continuously transmitted to sequentially reach each node, said network comprising
   means for controlling node access to the network
   CHARACTERIZED IN THAT
   said node access controlling means comprises
   means responsive to receiving the predefined data signal a predetermined number of times at each node for generating node signals each having a length varying in time in accordance with data traffic on the network to control node access to the network such that multiple ones of the nodes may concurrently write data onto the network in proportion to the network data traffic.

2. The network of claim 1
   CHARACTERIZED IN THAT
   said node signal generating means comprises
   means for detecting at each node the predefined data signal continuously transmitted on the network transmission paths and counting the number of times the predefined data signal is detected by a node.

3. The network of claim 2
   CHARACTERIZED IN THAT
   said node signal generating means also comprises
   means enabled by said detecting and counting means for registering the predetermined number of times the predefined data signal is detected by the node.

4. The network of claim 3
   CHARACTERIZED IN THAT
   said node signal generating means also comprises
   means for recording an active and idle state whenever the node is transmitting and not transmitting data received on a transmission path incoming to the node.

5. The network of claim 4
   CHARACTERIZED IN THAT
   said node signal generating means also comprises
   means for indicating when the node has write data to be written onto the network.

6. The network of claim 5
   CHARACTERIZED IN THAT
   said node signal generating means also comprises
   means for enabling the node to write data onto the network and to transmit data received on the incoming transmission path on a transmission path outgoing from the node.

7. The network of claim 6
   CHARACTERIZED IN THAT
   said node signal generating means also comprises
   means responsive to the recording means idle state and to the registering means having recorded the predetermined number of times the predefined data signal has been detected by the node for generating one of the node signals setting the enabling means in response to the indicating means indicating the node has write data to write the write data onto the outgoing transmission path.

8. The network of claim 7
CHARACTERIZED IN THAT
said node signal generating means also comprises
means enabled by the one generated node signal for initializing the detecting and counting means to an initial count.

9. The network of claim 8
CHARACTERIZED IN THAT
said node signal generating means further comprises
means for detecting an end of the write data and setting the enabling means to enable the node to transmit the received data on the outgoing transmission path.

10. The network of claim 9
CHARACTERIZED IN THAT
each of the nodes comprises
means for temporarily storing the data received on the incoming transmission path as the write data is written onto the outgoing transmission path.

11. A network for data transmission between nodes interconnected by transmission paths on which a predefined data signal is continuously transmitted to sequentially reach each node
CHARACTERIZED IN THAT
said network comprises
means for detecting the predetermined data signal at each node and counting the number of times the predefined data signal is detected by a node; and
means responsive to said detecting and counting means having counted a predetermined number of the detected predefined data signals for generating gate signals at each node having a length varying in time in accordance with the data traffic on the network to control node access to the network such that multiple ones of the nodes may concurrently write data onto the network in proportion to network data traffic.

12. The network of claim 11
CHARACTERIZED IN THAT
each network node comprises
means for storing the write data wherein said storing means has means for indicating when the node has stored write data to be written onto the network and means for detecting an end of the write data.

13. The network of claim 12
CHARACTERIZED IN THAT
said generating means comprises
means for recording an active state whenever the node is transmitting data received on a transmission path incoming to the node and for recording an idle state when the node is not transmitting the received data.

14. The network of claim 13
CHARACTERIZED IN THAT
said generating means also comprises
means responsive to the recording means idle state and to the predetermined number of detected predefined data signals for generating one of the gate signals enabling the node in response to the indicating means indicating stored write data to write the stored write data onto a transmission path outgoing from the node.

15. The network of claim 14
CHARACTERIZED IN THAT
said generating means further comprises
means enabled by said enabling means for initializing the detecting and counting means to return to an initial count, and
means reset by said detecting means detecting the end of the write data for disconnecting said storing means from the outgoing transmission path and enabling the node to transmit the received data on the outgoing transmission path.

16. A network for data transmission between nodes interconnected by transmission paths on which a predefined data signal is continuously transmitted to sequentially reach each node
CHARACTERIZED IN THAT
each node comprises
detector apparatus for detecting the predefined data signal,
counter apparatus connected to said detector apparatus for counting the number of times the predefined data signal is detected by the node,
register apparatus coupled to said counter apparatus for registering a predetermined number of times the predetermined data signal is detected by the node,
recording apparatus for recording an active state whenever the node is transmitting data received on a transmission path incoming to the node on a transmission path outgoing from the node and for recording an idle state when the node is not transmitting the received data,
store apparatus for storing write data wherein said store apparatus indicates when the node has stored the write data and detects an end of the write data, and
means responsive to the recording apparatus idle state and to the register apparatus predetermined number for enabling the node in response to the store apparatus indicating stored write data to write the stored write data on the outgoing transmission path in proportion to data traffic on the network.

17. A method of controlling data transmission on a network having nodes interconnected by transmission paths on which a predefined data signal is continuously transmitted to sequentially reach each node
CHARACTERIZED IN THAT
the data transmission controlling method comprises the steps of
detecting the predetermined data signal at each node and counting the number of times the predefined data signal is detected by a node; and
generating gate signals at the nodes having a length varying in time in accordance with data traffic on the network and in response to having counted a predetermined number of the detected predefined data signals to control the nodes such that multiple nodes may concurrently write data onto the network in proportion to network data traffic.

18. The data transmission controlling method of claim 17
CHARACTERIZED IN THAT
said method also comprises the steps of
storing write data in a node write store to be written onto a transmission path outgoing from the node,
indicating when the node has stored the write data, and
detecting an end of the stored write data.

19. The data transmission controlling method of claim 18
CHARACTERIZED IN THAT
said method also comprises the step of
recording an active state when the node is transmitting data received on a transmission path incoming to the node and an idle state when the node is not transmitting the received data.

20. The data transmission controlling method of claim 19
CHARACTERIZED IN THAT
said method also comprises the step of
enabling the node in response to the steps of indicating stored write data and to recording an idle state to write the stored write data onto the outgoing transmission path when the predetermined number of detected predefined data signals have been counted.

21. The data transmission controlling method of claim 20
CHARACTERIZED IN THAT
said method further comprises the steps of
initializing the detecting and counting step to return to an initial count, and
enabling the node in response to the step of detecting an end of the stored write data to transmit the received data onto the outgoing transmission path.

22. A node for transmitting data on a network having a plurality of the nodes interconnected by transmission paths on which a predetermined data signal is continuously transmitted to sequentially reach each node
CHARACTERIZED IN THAT
said node comprises
means for detecting the predefined data signal and counting the number of times the predefined data signal is detected by the node, and
means responsive to said detecting and counting means having counted a predetermined number of the detected predefined data signals for enabling the node to write data onto the network upon acquisition of the write data independent of the network location of the predefined data signal.

* * * * *